(12) United States Patent
Brattoli et al.

(10) Patent No.: US 7,533,686 B2
(45) Date of Patent: May 19, 2009

(54) MIXING SILLCOCK

(75) Inventors: Michael A. Brattoli, Elyria, OH (US); Mark S. Kacik, Strongsville, OH (US); Christopher Relyea, Columbus, OH (US); Mathew Smith, Wooster, OH (US); Allen Talley, Hudson, OH (US)

(73) Assignee: Moen Incorporated, North Olmsted, OH (US)

( * ) Notice: Subject to any disclaimer, the term of this patent is extended or adjusted under 35 U.S.C. 154(b) by 192 days.

(21) Appl. No.: 11/036,730

(22) Filed: Jan. 14, 2005

(65) Prior Publication Data
US 2005/0161087 A1 Jul. 28, 2005

Related U.S. Application Data

(60) Provisional application No. 60/481,907, filed on Jan. 16, 2004.

(51) Int. Cl.
*E03C 1/10* (2006.01)
(52) U.S. Cl. .................... 137/360; 137/625.4
(58) Field of Classification Search .......... 137/625.4, 137/625.17, 360
See application file for complete search history.

(56) References Cited

U.S. PATENT DOCUMENTS

| 536,801 A | 4/1895 | Gaghan |
| 2,652,224 A | 9/1953 | Noland et al. |
| 2,810,395 A | 10/1957 | Simmons |
| 2,870,780 A | 1/1959 | Fladung |
| 3,175,575 A | 3/1965 | Kennedy |
| 3,267,952 A | 8/1966 | Pletcher et al. |
| 3,267,956 A | 8/1966 | Kline |
| 3,407,837 A | 10/1968 | Fulton et al. |
| 3,494,373 A | 2/1970 | Horak et al. |
| 3,929,150 A | 12/1975 | Flinner et al. |
| 3,943,963 A | 3/1976 | Papacek |
| 3,952,770 A | 4/1976 | Botnick |
| 3,971,401 A | 7/1976 | Persson |
| 4,022,243 A | 5/1977 | Edwards |
| 4,158,366 A | 6/1979 | Van Meter |
| 4,178,956 A | 12/1979 | Fillman |
| 4,182,356 A | 1/1980 | Woodford, Sr. |
| 4,206,777 A | 6/1980 | Hirsch et al. |
| 4,209,033 A | 6/1980 | Hirsch et al. |
| 4,212,319 A | 7/1980 | Krablin |
| 4,221,233 A | 9/1980 | Botnick |
| 4,286,616 A | 9/1981 | Botnick |
| 4,305,419 A * | 12/1981 | Moen .................. 137/243 |
| 4,314,580 A | 2/1982 | Steinwand |
| 4,469,121 A * | 9/1984 | Moen .................. 137/100 |
| 4,475,570 A | 10/1984 | Pike et al. |
| 4,538,637 A | 9/1985 | Williams |
| 4,644,970 A * | 2/1987 | Lowry ................. 137/625.41 |

(Continued)

*Primary Examiner*—Stephen M Hepperle
*Assistant Examiner*—Cloud K Lee
(74) *Attorney, Agent, or Firm*—Calfee, Halter & Griswold, LLP

(57) ABSTRACT

In one embodiment, a frost-free sillcock is provided. The sillcock has a single handle which rotates to control the temperature of the discharged fluid. The handle also moves axially toward and away from a mounting surface to control the volume of fluid discharged from the sillcock. Furthermore, the sillcock has valve components disposed on the inside of the mounting surface which can be serviced from outside of the mounting surface.

4 Claims, 13 Drawing Sheets

U.S. PATENT DOCUMENTS

| | | |
|---|---|---|
| 4,821,762 A | 4/1989 | Breneman |
| 4,836,237 A | 6/1989 | McCullough |
| 4,844,116 A | 7/1989 | Buehler et al. |
| 4,909,270 A | 3/1990 | Enterante et al. |
| 4,971,097 A | 11/1990 | Hunley et al. |
| 5,012,833 A | 5/1991 | Hunley, Jr. |
| 5,029,603 A | 7/1991 | Ackroyd |
| 5,129,416 A | 7/1992 | Ackroyd |
| 5,158,105 A | 10/1992 | Conway |
| 5,275,195 A * | 1/1994 | Breda ..................... 137/100 |
| 5,392,805 A * | 2/1995 | Chrysler ................. 137/218 |
| 5,603,347 A | 2/1997 | Eaton |
| 5,697,393 A | 12/1997 | Mirlisena, Sr. |
| 5,740,831 A | 4/1998 | DeNardo et al. |
| 5,752,542 A | 5/1998 | Hoeptner, III |
| 5,842,499 A | 12/1998 | Hall |
| 5,884,661 A * | 3/1999 | Plyler et al. ............ 137/616.5 |
| 5,947,150 A | 9/1999 | Ryan |
| 5,964,246 A | 10/1999 | Meeker |
| 6,065,491 A | 5/2000 | Rider |
| 6,142,172 A | 11/2000 | Shuler et al. |
| 6,206,039 B1 | 3/2001 | Shuler et al. |
| 6,216,722 B1 | 4/2001 | Solomon |
| 6,234,205 B1 * | 5/2001 | D'Amelio et al. ...... 137/625.17 |
| 6,386,223 B1 * | 5/2002 | Hoeptner, III .............. 137/218 |
| 6,394,125 B2 | 5/2002 | White |
| 6,532,986 B1 | 3/2003 | Dickey et al. |
| 6,668,852 B1 | 12/2003 | Williamson |
| 6,679,473 B1 | 1/2004 | Ball |
| 6,769,446 B1 | 8/2004 | Ball et al. |
| 6,830,063 B1 | 12/2004 | Ball |
| 6,883,534 B2 | 4/2005 | Ball et al. |
| 7,140,390 B2 * | 11/2006 | Berkman et al. ......... 137/614.2 |
| 2002/0167164 A1 | 11/2002 | Thomas et al. |

\* cited by examiner

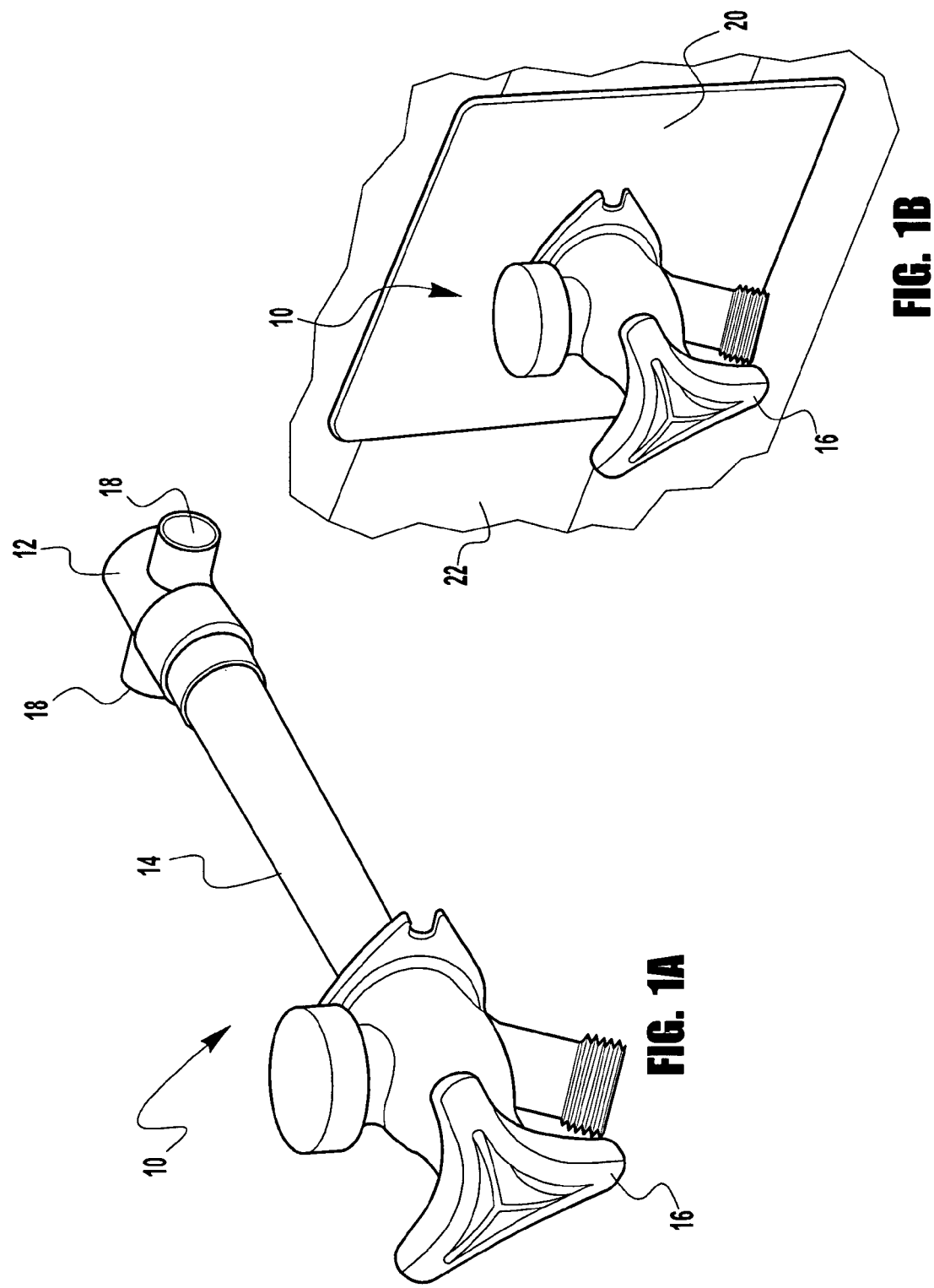

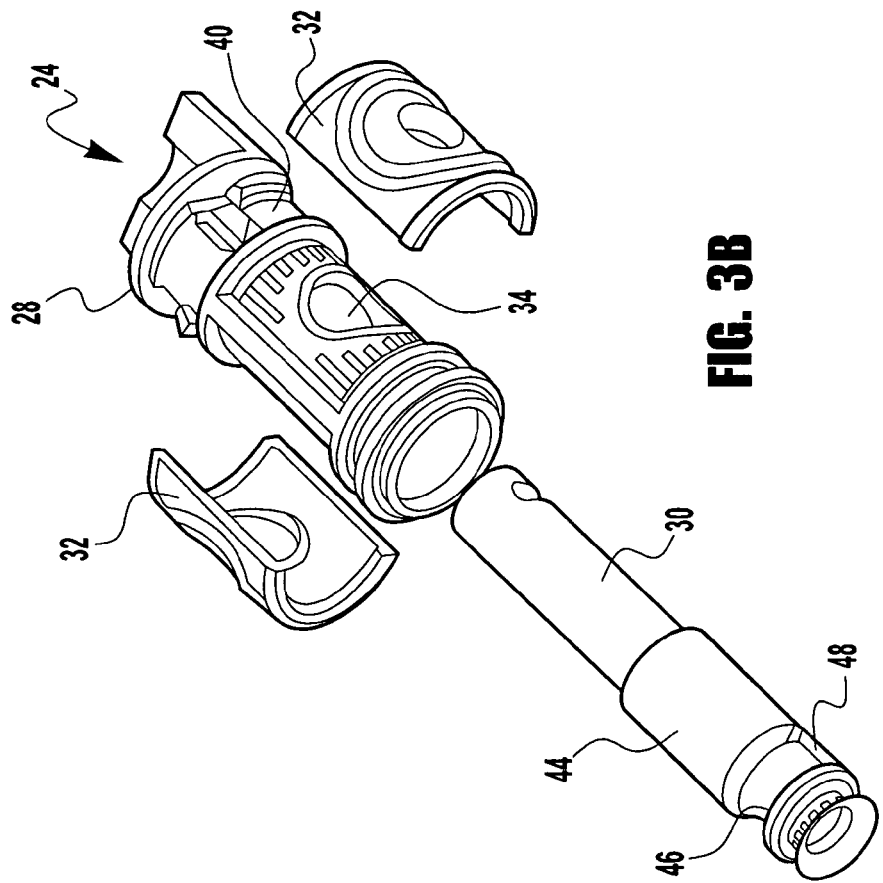
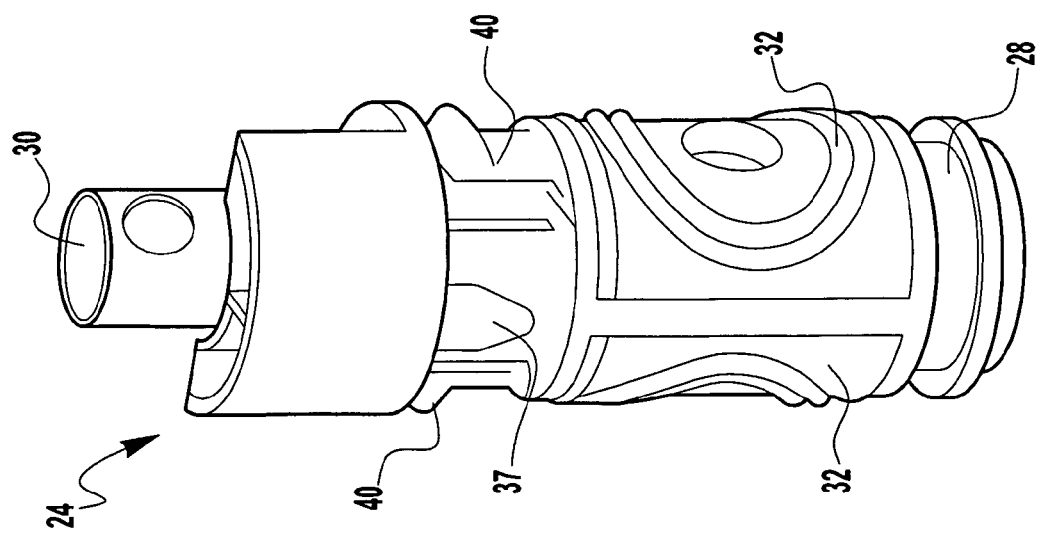

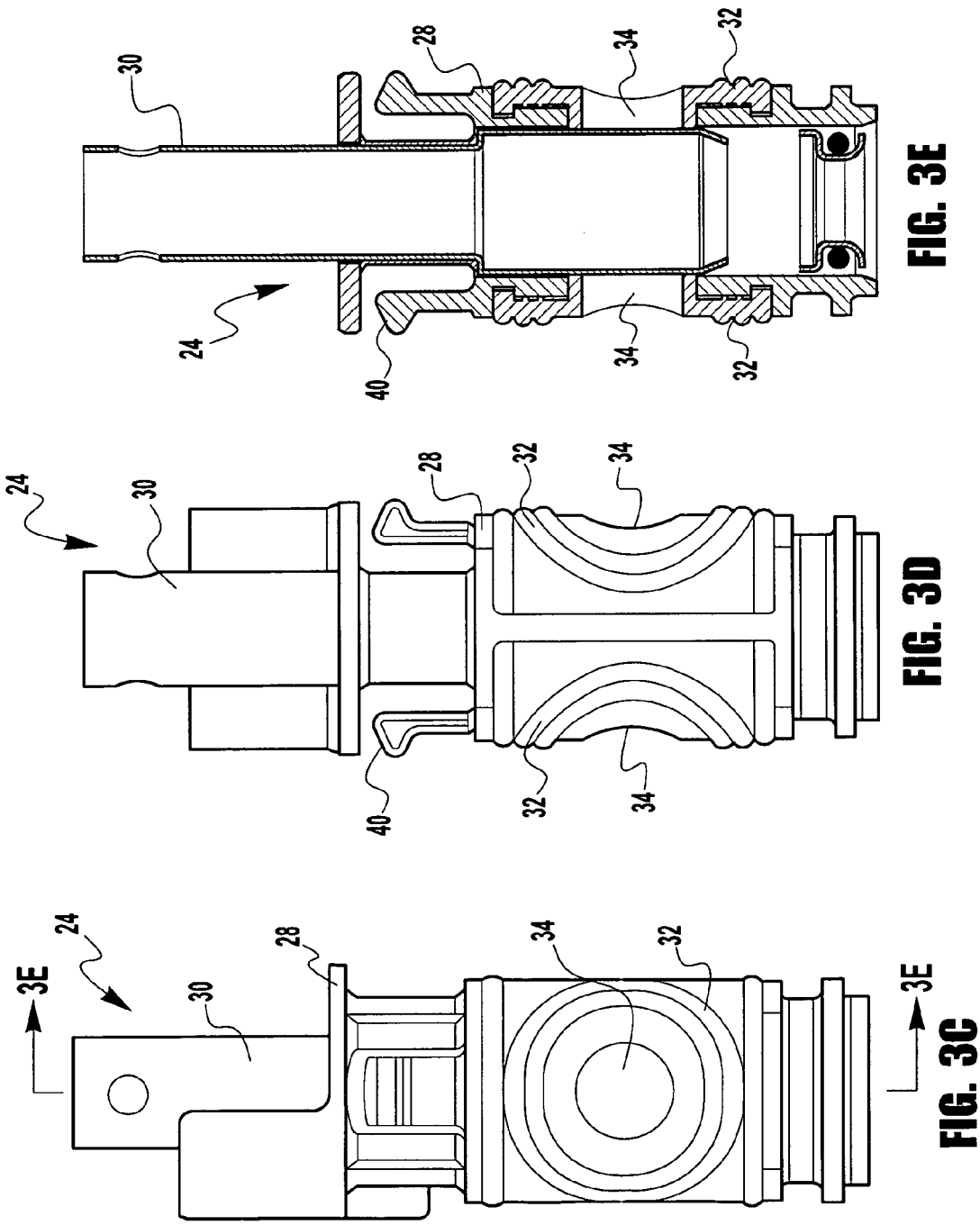

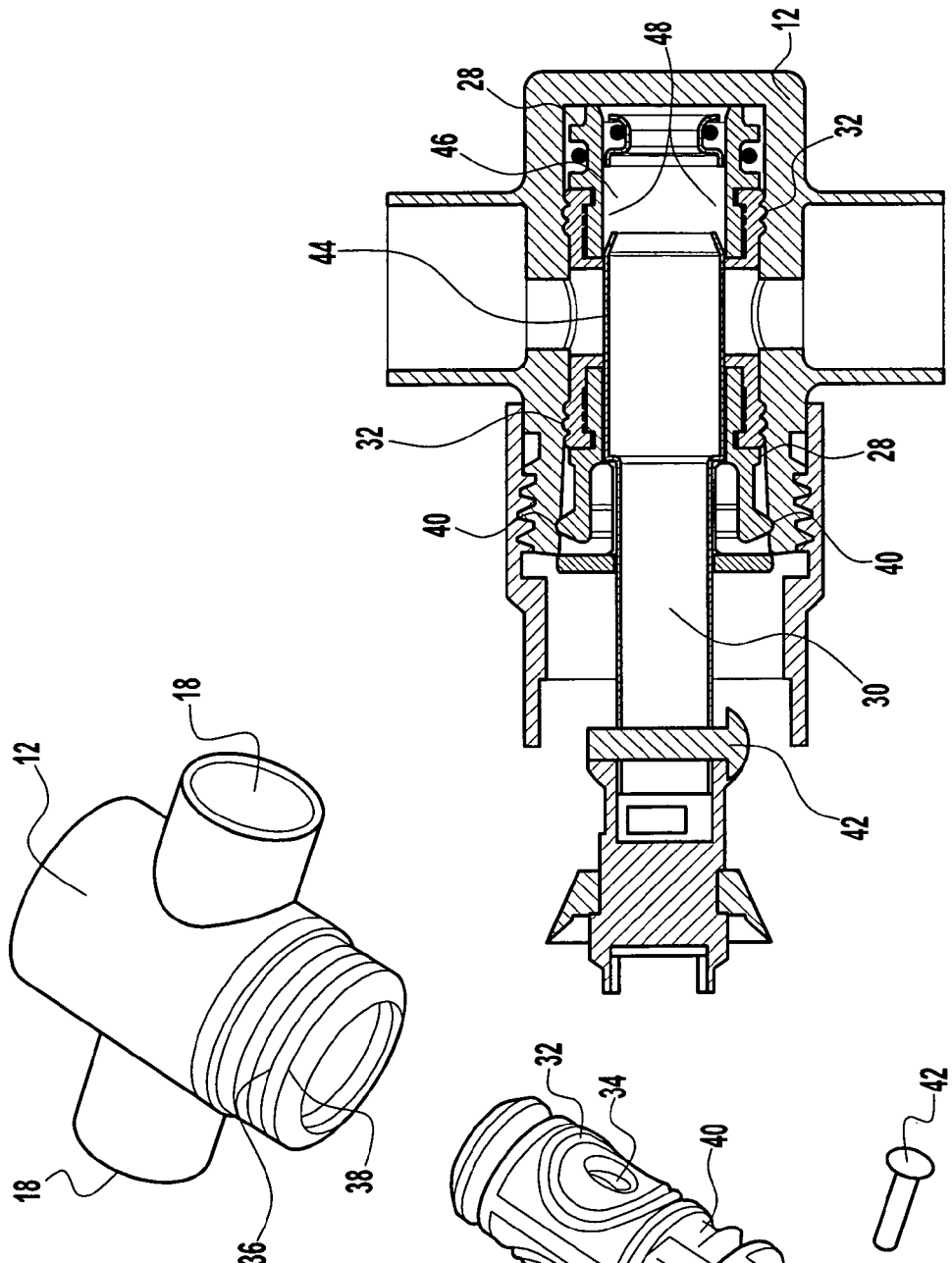

MIXING SILLCOCK

CROSS-REFERENCE TO RELATED APPLICATIONS

This application claims priority to, and any other benefit of, U.S. Provisional Application Ser. No. 60/481,907, filed on Jan. 16, 2004, and entitled "MIXING SILLCOCK," which is hereby incorporated by reference in its entirety.

BACKGROUND

The present invention relates to a sillcock, and more specifically to a frost-free mixing sillcock with a replaceable cartridge.

In many geographic areas, freezing temperatures cause problems with sillcocks as a result of the water within the sillcock freezing. Since water expands when it freezes, the expansion can cause components of the sillcock to become damaged. To avoid this problem, some sillcocks come with an elongated stem that, when installed, places its valve components inside the building, thus preventing the water from sitting near the exterior of the building and the freezing temperature. The placement of the valve components on the inside of the building requires any servicing of the valve components to be done from the inside of the building. Consequently, if the valve components are disposed behind a finished interior wall, access to the valve components is not convenient and servicing the valve components becomes a difficult project.

SUMMARY

In one embodiment, a frost-free mixing sillcock is provided. The sillcock has a single handle which rotates to control the temperature of the discharged fluid. The handle also moves axially toward and away from a mounting surface to control the volume of fluid discharged from the sillcock. Furthermore, the sillcock has valve components disposed on the inside of the mounting surface which can be serviced from outside of the mounting surface.

Numerous other advantages and features of the present invention will become readily apparent from the following detailed description of the invention and the embodiments thereof, from the claims and from the accompanying drawings.

BRIEF DESCRIPTION OF THE DRAWINGS

The invention as well as embodiments and advantages thereof are described below in greater detail, by way of example, with reference to the drawings in which:

FIG. 1A is a perspective view of a sillcock in accordance with one embodiment of the present invention;

FIG. 1B is a perspective view of the sillcock of FIG. 1A when installed on a mounting surface of a house;

FIG. 3A is a perspective view of the cartridge of FIG. 2;

FIG. 3B is an exploded perspective view of the cartridge of FIG. 2;

FIG. 3C is a side elevational view of the cartridge of FIG. 2;

FIG. 3D is a side elevational view of the cartridge of FIG. 2 rotated 90° from the view shown in FIG. 3C;

FIG. 3E is a cross-sectional view of the cartridge of FIG. 3C taken along the B-B line;

FIG. 4A is an exploded perspective view of the cartridge and valve body of FIG. 2;

FIG. 4B is a cross-sectional top view of the cartridge as installed within the valve body of FIG. 4A;

DETAILED DESCRIPTION

Figure 1C:
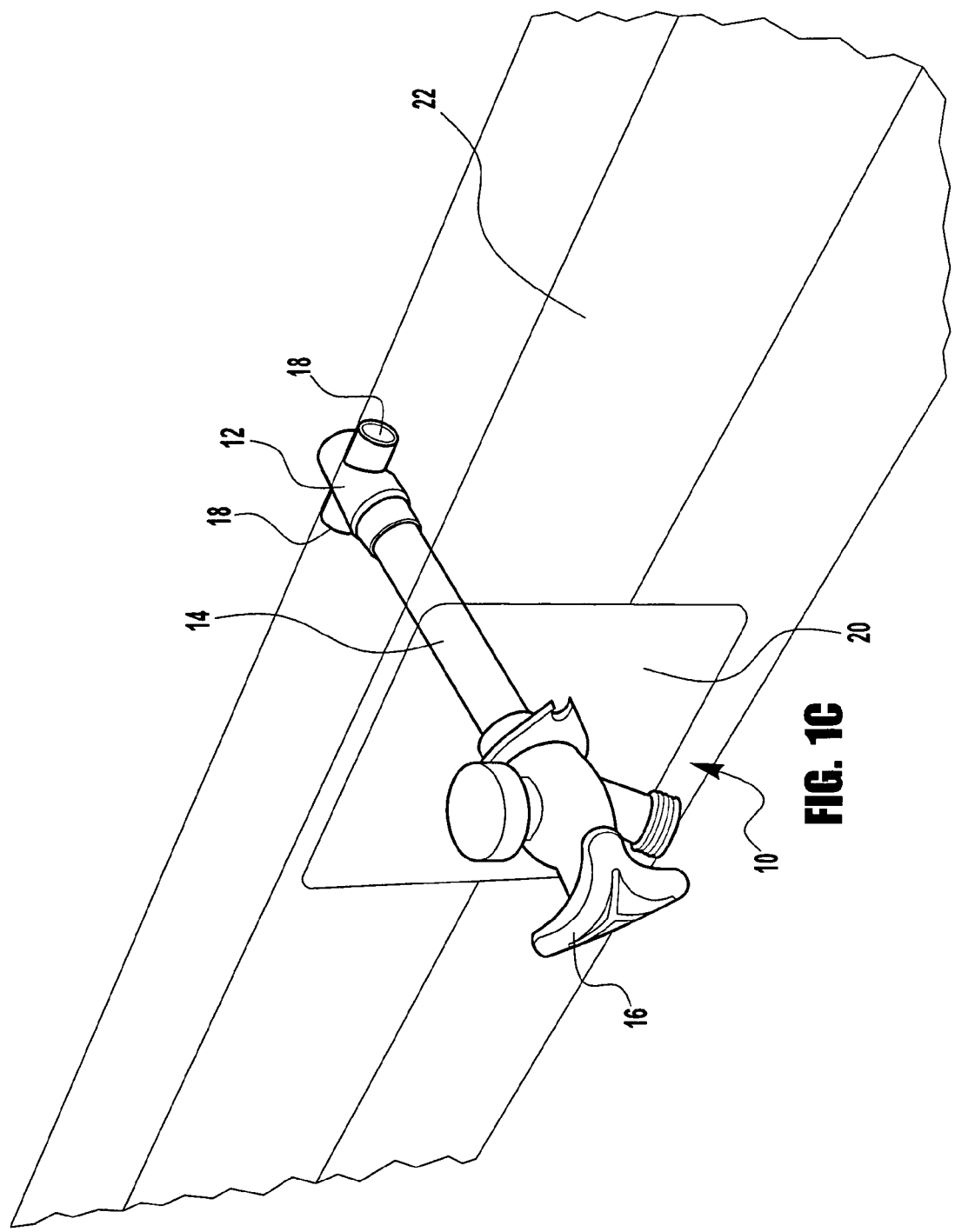
FIG. 1C is a perspective view of the sillcock of FIG. 1B with the mounting surface shown in phantom.

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Figure 2:
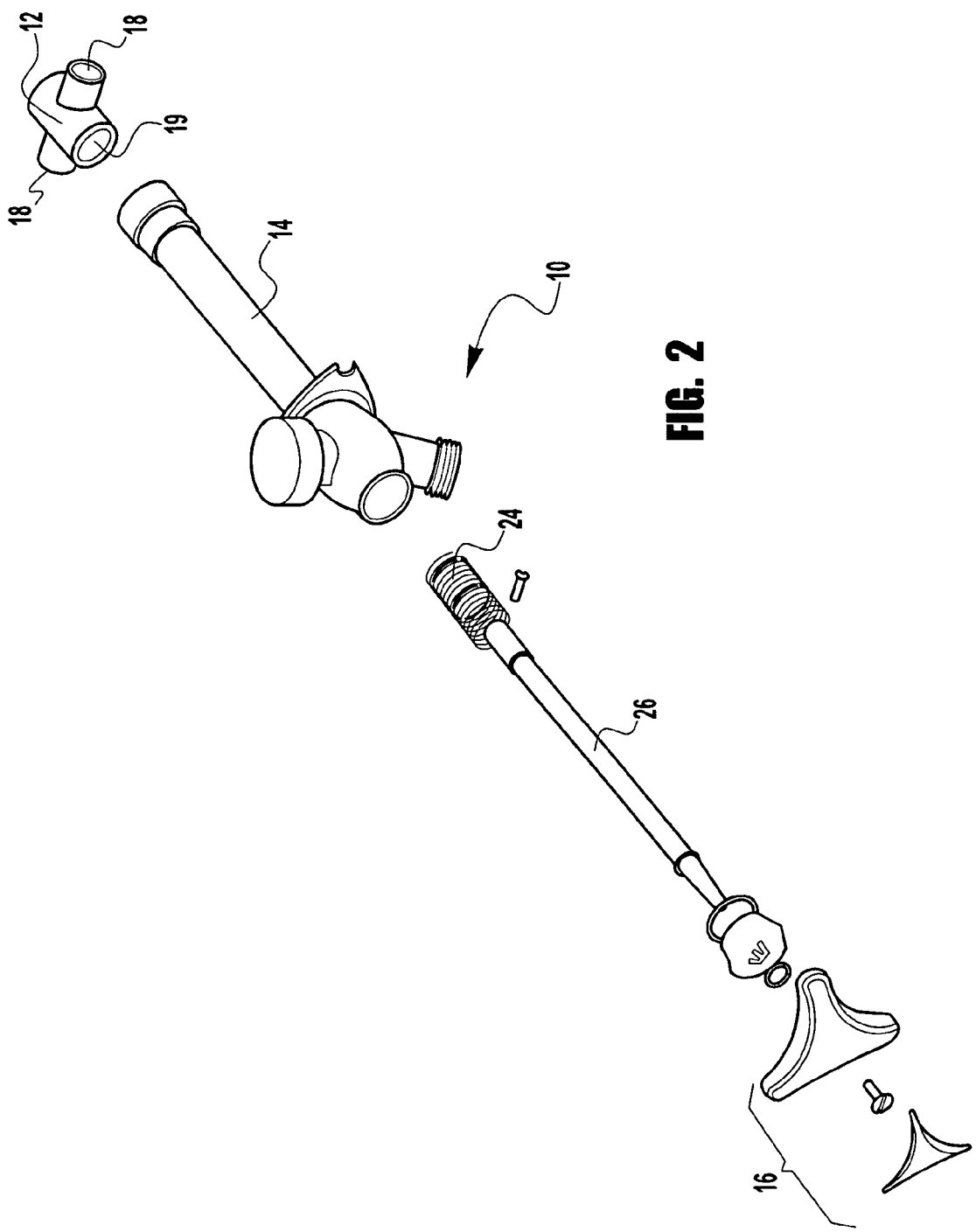
FIG. 2 is an exploded perspective view of the sillcock of FIG. 1A.

In one embodiment, a frost-free mixing sillcock 10 is provided as shown in FIGS. 1A-1C. The sillcock 10 includes a valve body 12, a body sub-assembly 14, and a handle 16. The valve body 12 is located at a distal end of the sillcock 10 and includes two inputs 18 and a single output 19 (FIG. 2). A hot water line is attached to one of the inputs 18 and a cold water line is attached to the other input 18. The valve body 12 is attached to the body sub-assembly 14. The sillcock 10 is mounted on a mounting surface 20 of a building or house 22.

Now referring to FIG. 2, an exploded view of the components of the sillcock 10 are shown. A cartridge 24 is disposed partially within the valve body 12 and partially within the body sub-assembly 14. The cartridge 24 is attached to a shaft 26. The cartridge 24 fits into the output 19 of the valve body 12 such as to form a water tight seal.

Now referring to FIGS. 3A-3E, the cartridge 24 is shown in various views. The cartridge 24 includes a cartridge shell 28, a piston 30 and may include one or more grommets 32. The shell 28 includes two ports 34 that align with the inputs 18 of the valve body 12 when the cartridge 24 is assembled into the valve body 12. The grommet 32 is located on the shell 28 about the ports 34 and provides a seal so that water can flow through the valve body 12 and into the cartridge shell 28.

Referring now to FIGS. 4A and 4B, the cartridge 24 installed within the valve body 12 is shown. The cartridge 24 may also include an alignment mechanism 36 and an assembly mechanism 40. The alignment mechanism 36, shown in the drawings as a protrusion 37 along a portion of the cartridge shell 28 and a notch 38 in the valve body 12, allows the cartridge 24 to be removed for inspection, maintenance or replacement, and then reconnected in a uniform manner that aligns the cartridge 24, and piston 30 within the valve body 12. The assembly mechanism 40 allows the cartridge 24 to be removed from and replaced into the valve body 12 with ease. Specifically, the assembly mechanism 40 allows the cartridge 24 to be removed without need to access the connection point between the body sub assembly 14 and the valve body 12. The figures illustrate one such assembly mechanism 40. A pair of snap wings are used to hold the cartridge 24 within the valve body 12. The wings are compressed within the opening 19 of the valve body 12 and the ends of the wings engage the end of the opening 19. When the cartridge 24 is removed, axial force is applied to the cartridge 24, whereby the ends of the wings cam against the end of the opening 19, thereby allowing removal of the cartridge 24.

The piston 30 is attached to the shaft 26 with a connection pin 42 or other connection mechanism. Preferably the connection mechanism is easily removable, thereby allowing easy change of the cartridge 24. The piston 30 is moved by the shaft 26 in two directions, in and out of the cartridge shell 28 and rotating about its axis within the shell 28. The piston 30 includes two portions. The first portion 44 is solid all around the axis of the piston 30 and aligns with the shell ports 34 when the piston 30 is moved into the cartridge shell 28. The second portion 46 is partially solid with a gap 48 formed about one quarter to one half of the total circumference of the piston 30. The second portion 46 aligns with the shell ports 34 when the piston 30 is pulled outward away from the shell 28. Preferably the piston 30 includes a stop that prevents the piston 30 from totally withdrawing from the cartridge shell 28. It is also preferable that the shaft 26 includes a stop that limits the distance the piston 30 travels into the cartridge shell 28. The second portion 46 is designed such that it can be rotated between two positions, with a stop preventing further rotation in each of the respective directions. When the piston 30 is rotated fully to a first temperature position, a solid portion 50 (FIG. 5) of the second portion 46 of the piston 30 aligns with a first port 34 in the cartridge shell 28, while the gap 48 aligns with the other port 34 in the cartridge shell 28. When the piston 30 is rotated to the second temperature position, the solid portion 50 aligns with the second port 34 in the cartridge shell 28, while the gap 48 aligns with the first port 34. When in one of these two temperature positions, either the hot water line or the cold water line is fully open. To mix the hot water and the cold water, the piston 30 is rotated to a position in between the full open positions, thereby opening each line a portion of the way. The total flow of water can be controlled by moving the piston 30 in and out of the cartridge shell 28. When the piston 30 is all of the way in the cartridge shell 28, or as far in as provided by the stop, the water flow is shut off. When the piston 30 is pulled outward away from the cartridge shell 28, as far as provided for by the stop, the flow is at its maximum. Positioning the piston 30 in between these two positions allows for controlling the flow of water.

Figure 5:
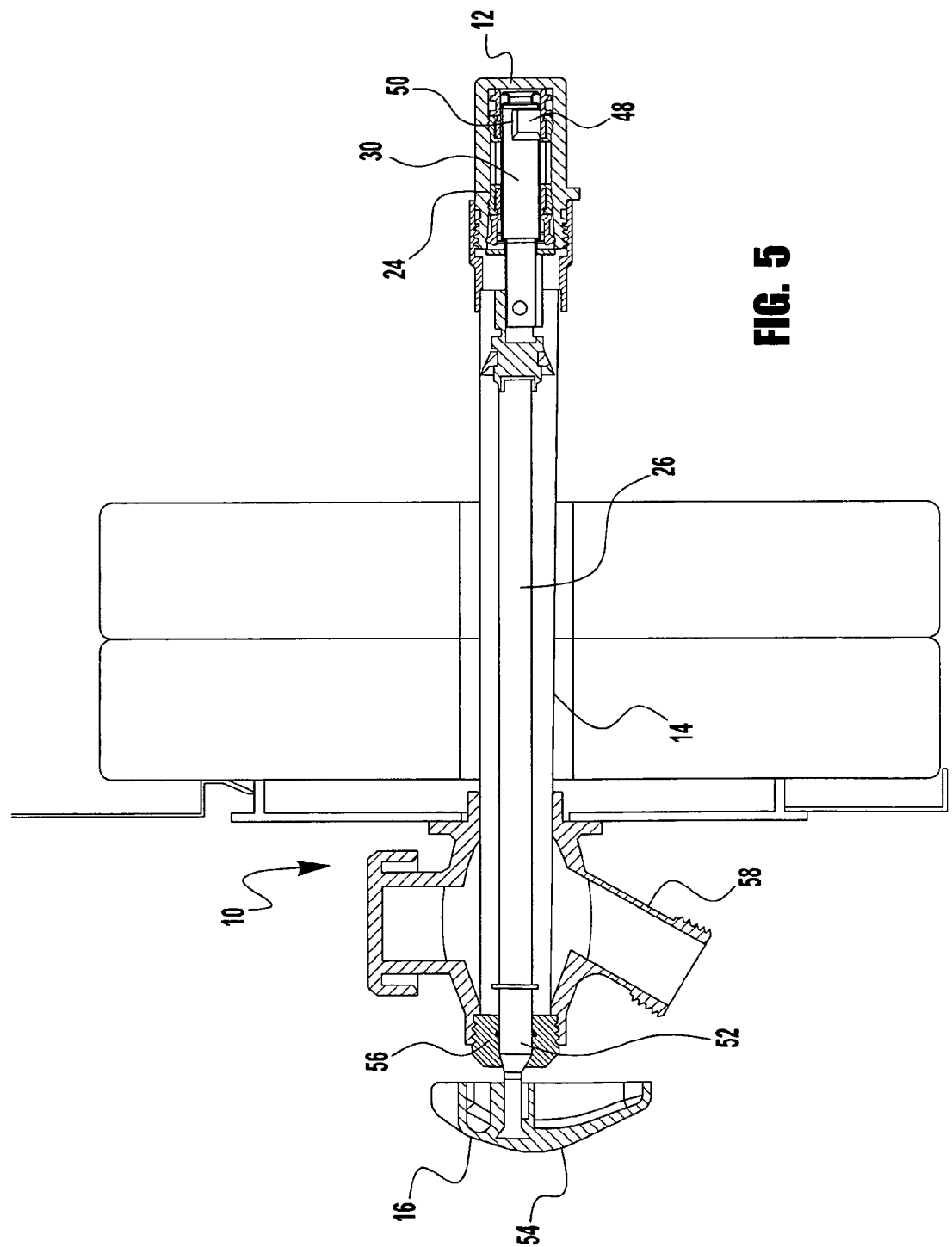
FIG. 5 is a cross-sectional view of the assembly of the sillcock of FIG. 1C is shown.

Referring now to FIG. 5, a cross-sectional view of the assembly of the sillcock 10 is shown. The piston 30 connects to the shaft 26, which rotates within the body sub-assembly 14. The handle 16 is fitted to an end 52 of the shaft 26, which allows for the easy turning of the shaft 26 as well as moving the shaft 26 outward away from the cartridge shell 28 or inward toward the cartridge shell 28. The movement of the shaft 26, either rotationally or axially, moves the piston 30 likewise. Movement of the handle 16 rotationally controls the temperature of the water, while movement of the handle 16 axially controls the flow of water. The handle 16 may include a handle cap 54 with a temperature-direction indicator, such as, for example, a color coded indicator. O-rings and a retention nut 56 are also used to provide a water-tight passageway.

To operate the sillcock 10, the handle 16 is pulled outward away from the side of the house 22, or other attachment area. Water flows from the valve body 12 and enters the cartridge shell 28 through the ports 34. The water continues through the shell 28 and through the piston 30 and then flows out the end of the piston 30 and through the slots (not shown) in the shaft 26. Water flows around the shaft 26 and then out the spigot 58. The temperature of the water can be controlled by turning the handle 16, a first direction for hot water and a second direction for cold water. Additionally, flow of water can be controlled by moving the handle 16 in and out with respect to the point of attachment.

The sillcock 10 allows for a single entrance point into the house 22, or other attachment area. Since the valve body 12 is located within the home 22, water can be mixed and flow out through a single freeze-proof faucet 58. Additionally, since the sillcock 10 includes an attachment mechanism (retention nut 56) that allows for removal of the cartridge 24 through a single opening in the front of the faucet, the cartridge 24 can be removed for maintenance, inspection, and replacement with relative ease. The alignment feature (alignment mechanism 36) allows a cartridge 24 that has been removed to be replaced in the correct alignment, thereby ensuring the ports 34 align with the valve body inputs 18.

Figure 6:
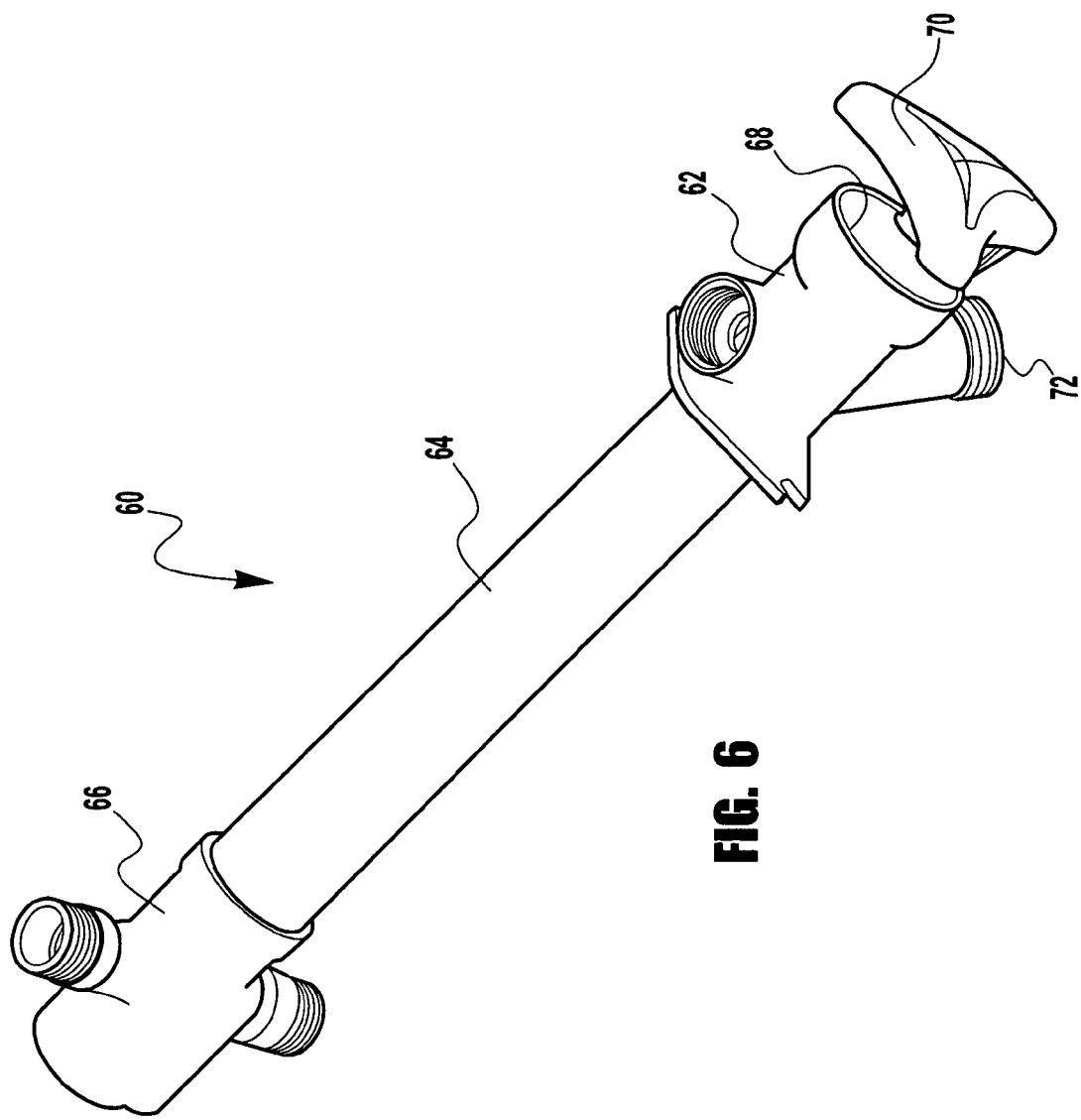
FIG. 6 is a perspective view of a sillcock in accordance with a second embodiment of the present invention.
Figure 7:
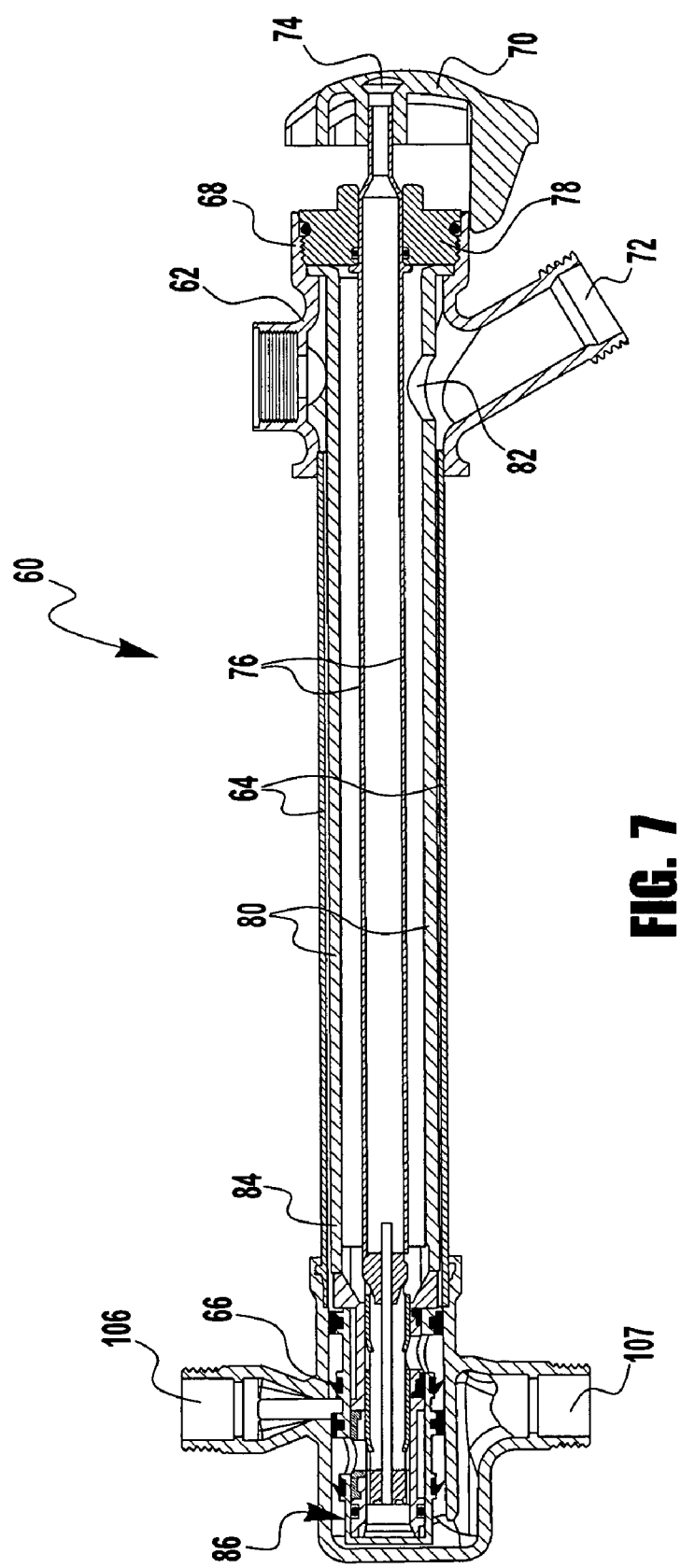
FIG. 7 is a cross-sectional view of the sillcock of FIG. 6.
Figure 8:
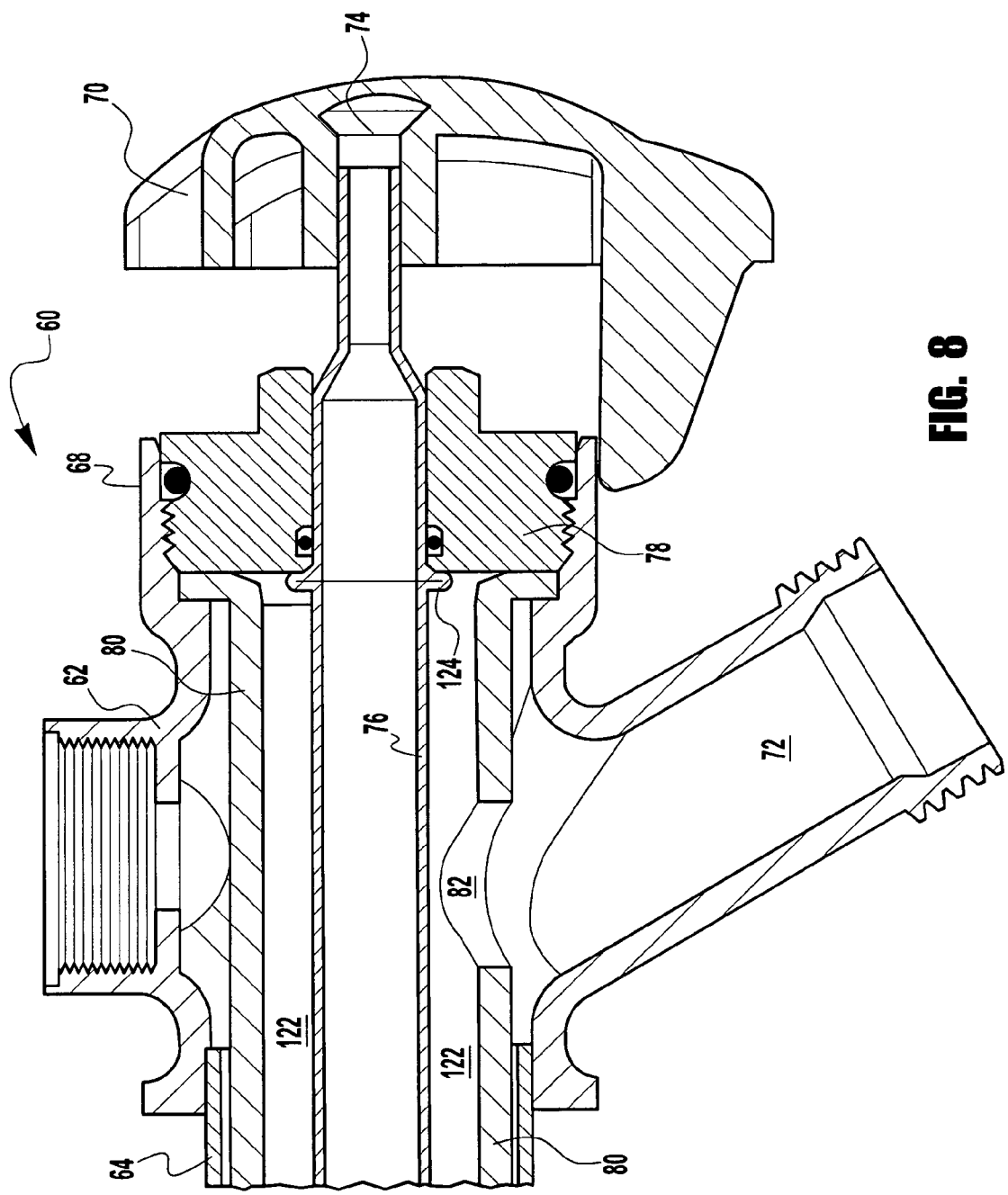
FIG. 8 is a magnified cross-sectional view of a spout end of the sillcock of FIG. 6.
Figure 9:
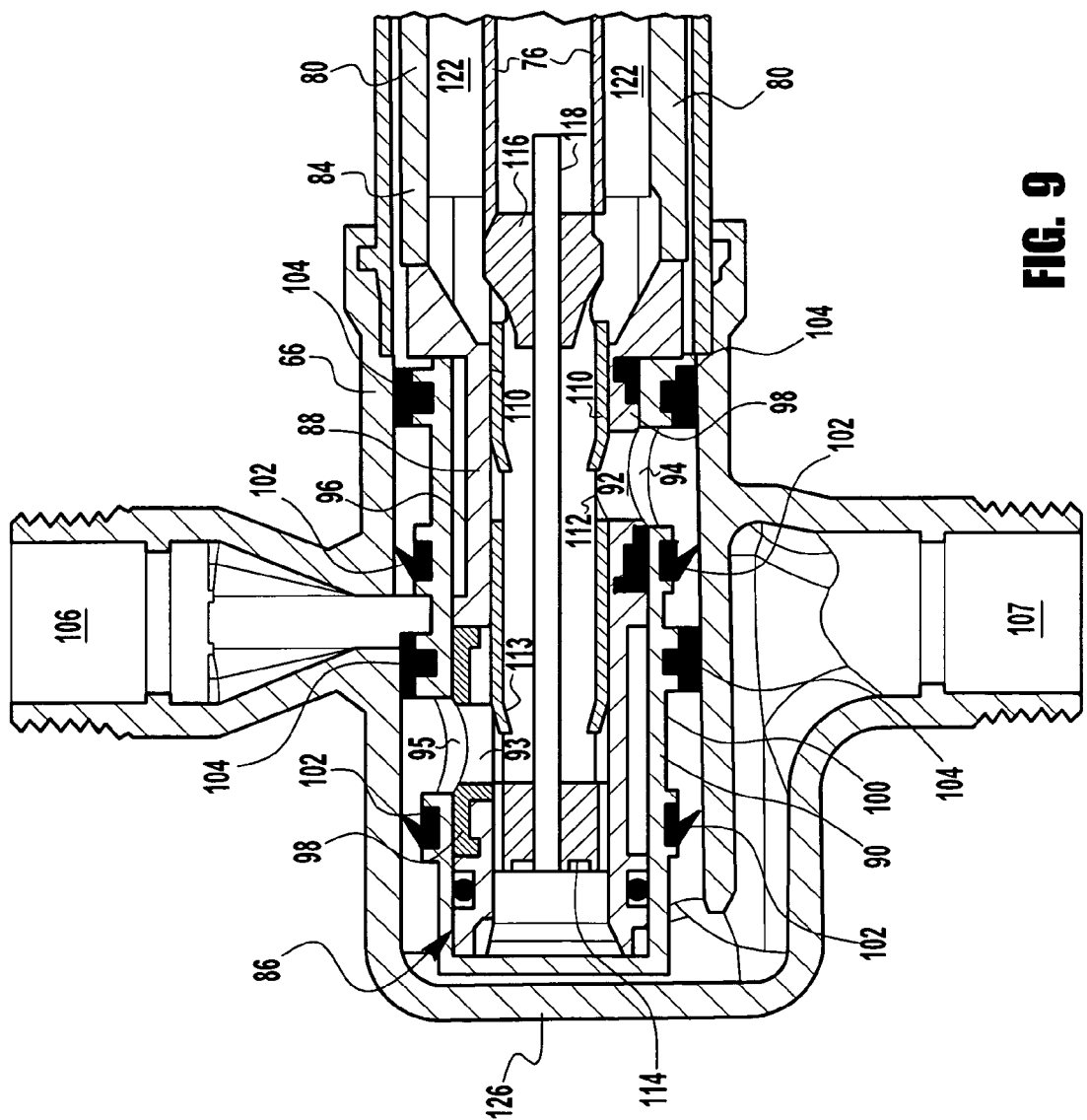
FIG. 9 is a magnified cross-sectional view of a valve end of the sillcock of FIG. 6.
Figure 10:
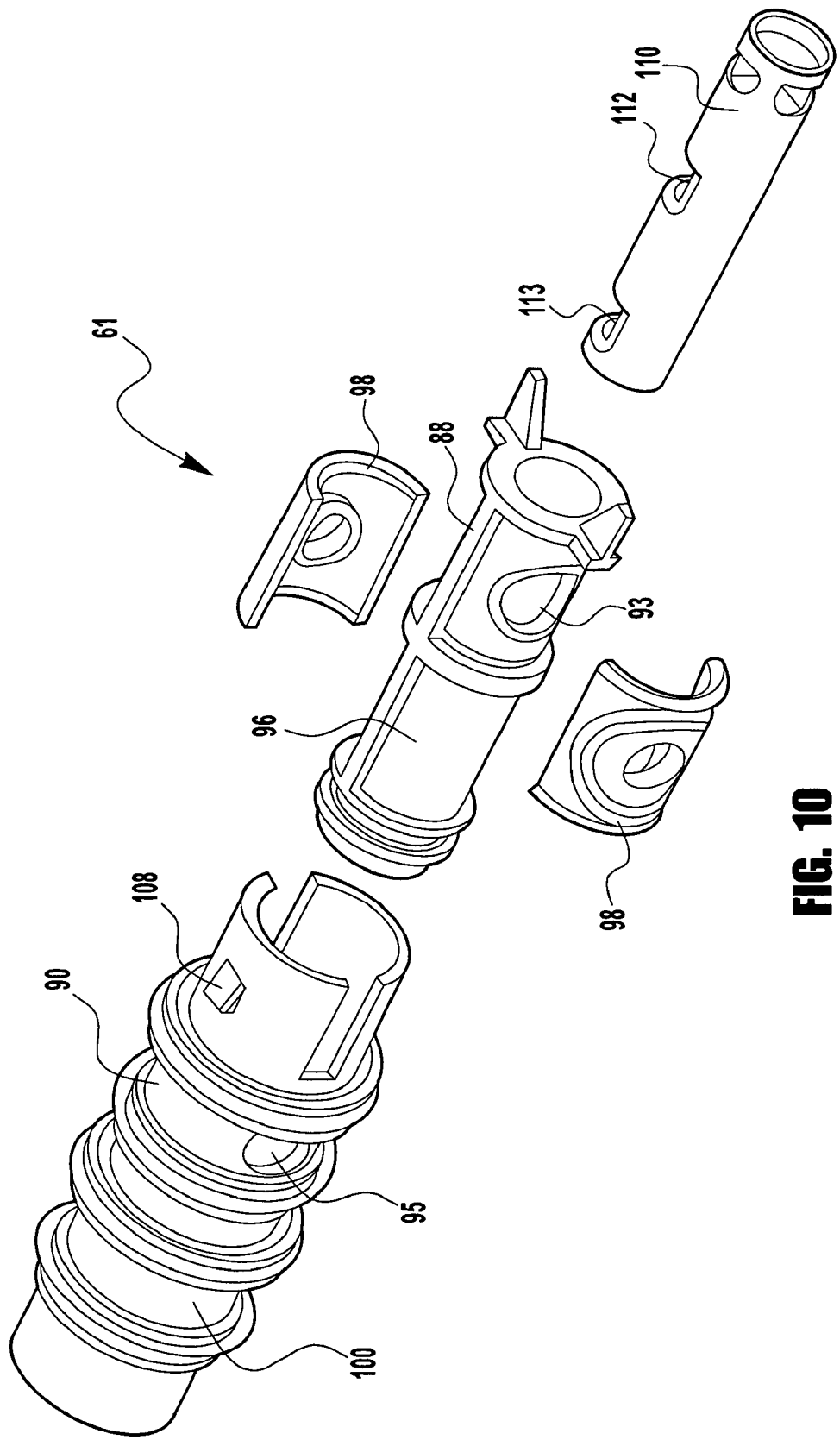
FIG. 10 is an exploded perspective view of the fluid mixing assembly of FIG. 6.

In a second embodiment, a frost-free mixing sillcock 60 is provided. FIG. 6 shows a perspective view of the sillcock. FIG. 7 shows a cross-sectional view of the sillcock 60, with a magnified view of the spout end shown in FIG. 8 and a magnified view of the valve body end shown in FIG. 9. FIG. 10 shows an exploded view of a fluid mixing assembly 61 of the sillcock 60. Referring to FIGS. 6-10, the sillcock 60 includes a spout 62, spout tube 64 and a valve body 66. As with the first embodiment discussed above, the spout 62, when installed, is disposed on the outside of the house or building upon which it is mounted. The spout tube 64 is a conduit that connects the spout 62 with the valve body 66. When installed, the majority of the spout tube 64 and the valve body 66 are disposed on the inside of the house (or building).

At a front end 68 of the spout 62, a handle 70 is disposed. The handle 70 is operable to move axially toward and away from the spout 62 to adjust the flow rate of the fluid that is discharged from an outlet 72 of the spout 62. Additionally, the handle 70 is operable to rotate to adjust the temperature of the fluid that is discharged from the outlet 72 of the spout 62.

The handle 70 is attached by a fastening member 74 to a stem 76 disposed in the spout 62 and in the spout tube 64. The stem 76 is held in place by a retaining nut 78 which is screw threaded onto the front end 68 of the spout 62. The stem 76 is hollow and allows air to pass therethrough. The stem 76 is also disposed within a cartridge retainer 80, which in turn, is disposed within the spout 62 and the spout tube 64. The cartridge retainer 80 is a hollow conduit that has a drain hole 82 disposed near and aligned with the outlet 72 of the spout 62. The cartridge retainer 80 is held in place by the retaining nut 78.

A cartridge 86 is disposed on an interior end 84 of the cartridge retainer 80. The cartridge 86 comprises an inner shell 88 and an outer shell 90. The inner shell 88 is disposed within the outer shell 90. Additionally, the inner shell 88 has two ports 92, 93 disposed therethrough which align with two ports 94, 95 disposed through the outer shell 90. The ports 92, 93, 94, 95 allow fluid to flow from the valve body 66 into the cartridge 86. When installed, the cartridge 86 sits within the valve body 66.

On an outer surface 96 of the inner shell 88, a pair of grommets 98 are disposed. The grommets 98 provide a seal between the outer shell 90 and a piston 110. On an outer surface 100 of the outer shell 90, a pair of check valves 102 and a pair of shouldered O-rings 104 are disposed. The check valves 102 prevent fluid from being siphoned back into the fluid supply lines (not shown) which are connected to inlets 106, 107 of the valve body 66. The O-rings 104 provide a seal between the valve body 66 and the outer shell 90.

The inner shell 88 is attached to the cartridge retainer 80 using an assembly mechanism 108 similar to the one described above with respect to the first embodiment.

The piston 110 is disposed, at least partially, within the inner shell 88. The piston 110 is a hollow conduit having a pair of apertures 112, 113, which when aligned with the ports 92, 94 and 93, 95, respectively allow fluid to flow into the piston 110 and toward the spout 62. The apertures 112, 113 of the piston 110 are offset to correspond to the offset positions of the ports 92, 94 and 93, 95. The piston 110 is disposed between a back plug 114 and a stem plug 116. The stem plug 116 is attached to the stem 76 which is in turn connected to the handle 70. This allows the movement of the handle 70 to move the piston 110 in a corresponding manner. For example, if the handle 70 is rotated clockwise, the piston 110 will rotate clockwise. If the handle 70 is pulled axially away from the spout 62, the piston 110 will move axially in the same direction.

Furthermore, the piston 110 includes a vent tube 118 which is disposed axially through the piston 110 and into the stem 76. The vent tube 118 allows any air pressure that may build up behind the back plug 114 to vent to the atmosphere at the front end 68 of the spout 62 by virtue of an air conduit formed by the vent tube 118 and stem 76.

In operation, the handle 70 begins flush against the front end 68 of the spout 62. A hot water supply pipe is connected to inlet 106 and a cold water supply line is connected to inlet 107 of the valve body 66. As a result of the handle 70 being flush against the front end 68 of the spout 62, the piston 110 is positioned axially rearward such that apertures 112, 113 of the piston 110 are not aligned with the ports 92, 94 and 93, 95 of the inner shell 88 and the outer shell 90 of the cartridge 86. More specifically, aperture 113 will be positioned to the left (referring to FIG. 6) of the ports 93, 95 and aperture 112 will be positioned. to the left of the ports 92, 94. In this position, a wall 120 of the piston 110 will cover the ports 92, 93, thereby preventing any water flow into the piston 110. Hot water flows through inlet 106, into the valve body 66 and into ports 92, 94. However, as discussed above, the hot water is prevented from flowing into the piston 110 because, in this position, the wall 120 of the piston 110 covers the port 92. Similarly, the cold water enters inlet 107, flows into the valve body 66 and into ports 93, 95, but is prevented from entering the piston 110 because the wall 120 of piston 110, in this position, covers port 93. Even if the handle 70 is rotated, there will be no water flow into the piston 110 (and ultimately out of the spout 62) until the handle 70 is moved axially away from the front end 68 of the spout 62.

As the handle 70 is slowly pulled axially away from the front end 68 of the spout 62 (assuming that the handle 70 is in a rotationally centered position), the attached stem 76, stem plug 116, piston 110, vent tube 118 and back plug 114 all move axially with the handle 70. As this occurs, the aperture 113 begins to partially align with the port 93 and the aperture 112 begins to partially align with the port 92. As this happens, hot water slowly flows into the piston 110 through the aperture 112 and cold water slowly flows into the piston 110 through the aperture 113. The hot and cold water mix within piston 110 and flow around the stem plug 116, into a cavity 122 formed between the stem 76 and the cartridge retainer 80. The mixed water continues to flow through the cavity 122, out through the drain hole 82, and out through the outlet 72 of the spout 62.

During the axial movement of the piston 110, the inner shell 88 and the outer shell 90 remain stationary. The farther the handle 70 is pulled axially away from the front end 68 of the spout 62, the more the apertures 112, 113 align with the ports 92, 93 respectively and the greater the flow rate out of the outlet 72 of the spout 62. The handle 70 may be pulled axially away from the front end 68 of the spout 62 until a stop 124 of the stem 76 abuts the retaining nut 78. At this point, the spout is discharging maximum flow because the apertures 112, 113 are fully aligned with the ports 92, 93 respectively.

At any time while the water is flowing (at any axial position of the handle 70), the temperature of the discharged water can be controlled by rotating the handle 70 in either direction. When the handle 70 rotates in a first direction, the discharging water becomes colder and when the handle is rotated in a second, opposite direction, the discharging water becomes hotter. This is a result of the apertures 112, 113 being rotated in and out of alignment with the ports 92, 93 respectively. For example, as the handle 70 is rotated in a first direction, the piston 110 is rotated in a corresponding manner and direction. As the piston 110 rotates, the aperture 113 becomes more fully aligned rotationally with the port 93 while the aperture 112 becomes less aligned rotationally with the port 92. As a result, proportionally, more cold water enters the piston 110 than hot water, and the discharging water becomes colder. The opposite occurs when the handle 70 is rotated in the opposite direction. As a result of this design, at any given discharging water flow (determined by how far the handle 70 is pulled away from the front end 68 of the spout 62), the temperature of the discharging water can be varied. In other words, the temperature of the discharging water is completely independent from the flow rate of the discharging water.

The embodiment shown in FIG. 6 also allows the cartridge 86 to be serviced from the outside of the house instead of from the inside of the house. Often repairing or replacing any of the cartridge components requires access from the interior of the house since that is where the valve body 66 and the cartridge 86 are disposed. However, the embodiment shown in FIG. 6 allows the cartridge 86 to be removed from the outside.

To remove the cartridge 86, the handle 70 is first unattached from the stem 76 by removing the fastening means 74. With the handle 70 removed, the retaining nut 78 can be unscrewed from the front end 68 of the spout 62. The stem 76 can then be axially pulled to remove the back plug 114, vent tube 118, piston 110 and stem plug 116. These components can then be serviced if needed and replaced back in a reverse step manner. However, if servicing is needed on the cartridge 86, the cartridge retainer 80 can then be axially pulled to remove the inner shell 88, outer shell 90, grommets 98, check valves 102, and O-rings 104. After servicing, the parts are reassembled in the same manner, just taking the above steps in reverse order.

Figure 11:
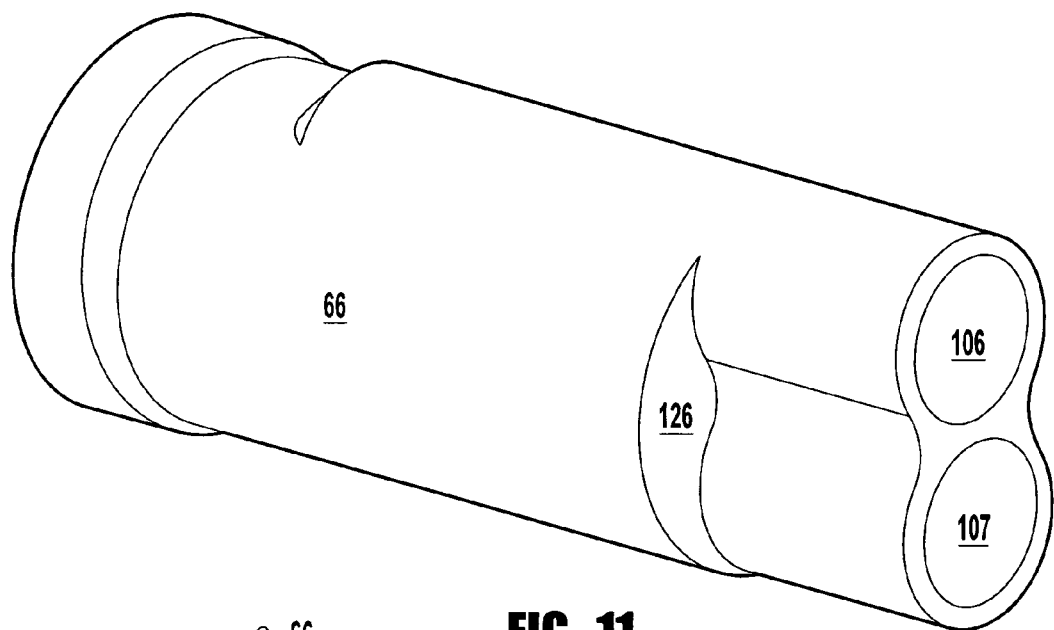
FIG. 11 is a perspective view of a valve body in accordance with an embodiment of the present invention.
Figure 12:
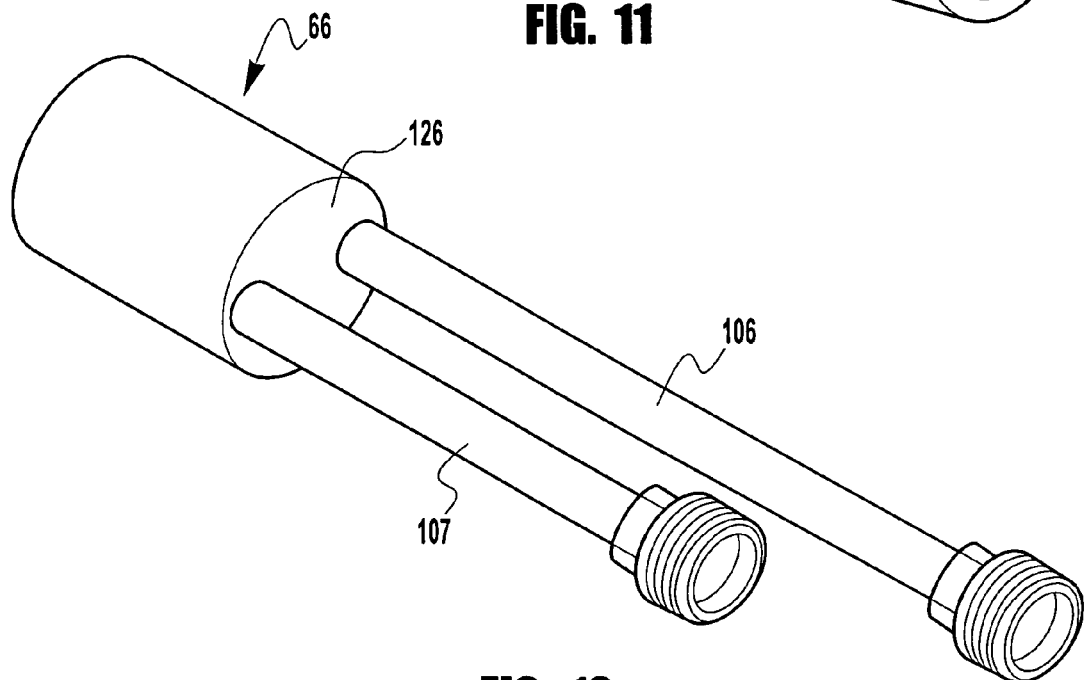
FIG. 12 is a perspective view of a valve body in accordance with an embodiment of the present invention.

Finally, FIGS. 11 and 12 show two other possible designs for the valve body 66. FIG. 11 shows an embodiment in which the inlets 106, 107 are disposed on a rear end 126 of the valve body 66. However, the interior of the valve body would be substantially similar to that shown in FIG. 6. FIG. 12 shows a valve body in which two flexible inlet connections 106, 107 are disposed off of the rear end 126 of the valve body 66. The flexible inlets 106, 107 give the installer greater flexibility and makes installation easier.

The above description of some of the embodiments of the present invention has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A frost-free mixing sillcock comprising:
 a spout mounted outside of a structure;
 a valve body having inlets for connection to a hot fluid supply and a cold fluid supply, said valve body disposed inside said structure;
 a cartridge assembly disposed at least partially within said valve body, said cartridge assembly operable to mix fluid from said hot fluid supply and said cold fluid supply;
 a single handle operable to adjust at least one of temperature and flow rate of fluid discharging from said spout, and
 a cartridge retainer,
 wherein a first end of said cartridge retainer is disposed inside said structure and detachably connected to said cartridge assembly,
 wherein a second end of said cartridge retainer is disposed outside said structure and interfaces with said spout, and
 wherein said cartridge assembly is operable to be serviced from said exterior of said structure without unmounting said spout from said structure.

2. The frost-free mixing sillcock of claim 1, further comprising an attachment mechanism,
 wherein said attachment mechanism interfaces with said spout to secure said cartridge retainer in said spout.

3. The frost-free mixing sillcock of claim 2, wherein upon detachment of said handle and said attachment mechanism from said spout, said entire cartridge assembly is operable to be removed from said spout by axial movement of said cartridge retainer.

4. The frost-free mixing sillcock of claim 1, wherein a length of said cartridge retainer is greater than a length of said cartridge assembly.

* * * * *